US012752768B2

(12) United States Patent
Sarwar et al.

(10) Patent No.: US 12,752,768 B2
(45) Date of Patent: Oct. 6, 2026

(54) SYSTEMS AND METHODS FOR MIGITATING EMISSIONS GENERATED BY HYBRID VEHICLES

(71) Applicant: GM GLOBAL TECHNOLOGY OPERATIONS LLC, Detroit, MI (US)

(72) Inventors: Azeem Sarwar, Rochester Hills, MI (US); Mark Claywell, Birmingham, MI (US); Maqsood Rizwan Ali Khan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 17 days.

(21) Appl. No.: 18/904,937

(22) Filed: Oct. 2, 2024

(65) Prior Publication Data

US 2026/0091771 A1 Apr. 2, 2026

(51) Int. Cl.

| | |
|---|---|
| ***B60W 20/16*** | (2016.01) |
| ***B60W 10/06*** | (2006.01) |
| ***B60W 10/08*** | (2006.01) |
| ***B60W 10/30*** | (2006.01) |

(52) U.S. Cl.

CPC ............ *B60W 20/16* (2016.01); *B60W 10/06* (2013.01); *B60W 10/08* (2013.01); *B60W 10/30* (2013.01)

(58) Field of Classification Search

CPC ...... B60W 20/16; B60W 10/06; B60W 10/08; B60W 10/30

See application file for complete search history.

(56) References Cited

U.S. PATENT DOCUMENTS

| | | | | |
|---|---|---|---|---|
| 2,742,437 | A | 4/1956 | Houdry | |
| 4,999,999 | A | 3/1991 | Takahashi et al. | |
| 10,328,924 | B2 * | 6/2019 | Ulrey | F01N 13/00 |
| 2005/0197236 | A1 * | 9/2005 | Doering | F02D 41/0087 477/181 |
| 2020/0122709 | A1 * | 4/2020 | Cunningham | F02D 13/0207 |
| 2025/0250917 | A1 * | 8/2025 | Light-Holets | F01M 5/005 |

FOREIGN PATENT DOCUMENTS

| | | | |
|---|---|---|---|
| DE | 532 | C | 8/1877 |
| DE | 28243 | A | 12/1883 |
| GB | 190407526 | A | 3/1905 |

* cited by examiner

*Primary Examiner* — Scott A Browne
*Assistant Examiner* — Lidia Kwiatkowska
(74) *Attorney, Agent, or Firm* — Ingrassia Fisher & Lorenz, LLP | IFL

(57) ABSTRACT

An ICE emission mitigation signal is received prior to normal operation of an ICE of a hybrid vehicle. A command is issued to at least partially open a throttle to enable air flow into an intake manifold. A command is issued to an electric motor system to rotate a crankshaft coupled to each of the cylinders. The reciprocating motion of a piston in each cylinder compresses air in a combustion chamber of the cylinder causing compressed air to flow out of the combustion chamber. The air flowing into the combustion chamber has a first temperature and the compressed air flowing out of the combustion chamber has a second temperature. The second temperature is higher than the first temperature. The compressed air flows from the combustion chamber of the cylinder to an exhaust manifold via an exhaust valve of the cylinder and from the exhaust manifold through a catalyst brick.

14 Claims, 5 Drawing Sheets

SYSTEMS AND METHODS FOR MIGITATING EMISSIONS GENERATED BY HYBRID VEHICLES

INTRODUCTION

The technical field generally relates to vehicles, and more particularly relates to systems and methods for mitigating emissions generated by hybrid vehicles.

Hybrid vehicles include an electric engine and an internal combustion engine (ICE). The ICE generates exhaust gases as a by-product of a combustion process. A catalyst brick in a catalytic converter is typically used to process the exhaust gases prior to release of the processed exhaust gases as emissions from the vehicle. Catalyst bricks typically need to reach an operating temperature, such as for example 500 C°, to effectively process the exhaust gases. The operating temperature of the catalyst brick is referred to as a catalyst light-off temperature. A cold-start of an ICE occurs when the ICE has been non-operational for several hours. At cold start-up of the ICE, excessive emissions may be emitted until the catalyst brick reaches the catalyst light-off temperature.

Accordingly, it is desirable to provide systems and methods for mitigating emissions generated by hybrid vehicles. Other desirable features and characteristics will become apparent from the subsequent detailed description and the appended claims, taken in conjunction with the accompanying drawings and the foregoing technical field and background.

SUMMARY

A method of mitigating emissions generated by a hybrid vehicle includes receiving, at a controller, an internal combustion engine (ICE) emission mitigation signal prior to initiating normal operation of an ICE of the hybrid vehicle. The ICE includes a plurality of cylinders, wherein each of the plurality of cylinders includes: a combustion chamber; an intake valve configured to be opened to enable a first air flow from an intake manifold to the combustion chamber and closed to restrict the first air flow from the intake manifold to the combustion chamber; an exhaust valve configured to be opened to enable a second air flow from the combustion chamber to an exhaust manifold and a closed to restrict the second air flow from the combustion chamber to the exhaust manifold; a piston; and a crankshaft coupled to the piston, wherein rotation of the crankshaft causes a reciprocating motion of the piston within the cylinder. The method includes: issuing, by the controller, a first command to a throttle system of the hybrid vehicle to at least partially open a throttle to enable air flow into the intake manifold; issuing, by the controller, a second command to an electric motor system of the hybrid vehicle to rotate the crankshaft coupled to each of the plurality of cylinders, wherein: the reciprocating motion of the piston in each cylinder compresses air in the combustion chamber of the cylinder causing the second air flow to be a compressed version of the first air flow; the first air flow has a first temperature, and the second flow air flow has a second temperature, the second temperature being higher than the first temperature; and the second air flow flows from the combustion chamber of the cylinder to the exhaust manifold via the exhaust valve of the cylinder and from the exhaust manifold through a catalyst brick.

In at least one embodiment, an exhaust back pressure valve is disposed one of between the exhaust manifold and the catalyst brick and after the catalyst brick, and the method further includes issuing by the controller, a third command to an exhaust back pressure valve system to at least partially close the exhaust back pressure valve.

In at least one embodiment, the electric motor system includes at least one of an P0 electric motor, a P1 electric motor, a P2 electric motor, a P3 electric motor, and a P4 electric motor; and the method further includes issuing, by the controller, the second command to the electric motor system to rotate the crankshaft coupled to each of the plurality of cylinders causes one of the at least one of the P0 electric motor, the P1 electric motor, the P2 electric motor, the P3 electric motor, and the P4 electric motor to generate electrical power to implement the rotation of the crankshaft.

In at least one embodiment, the method further includes issuing, by the controller, a fourth command to an oil pump system to increase lubricant oil flow into the ICE.

In at least one embodiment, the method further includes issuing by the controller, a fifth command a thermal coolant system to one of turn off coolant flow to the ICE and turn off coolant flow to the oil-to-water heat exchanger.

In at least one embodiment, the method further includes issuing by the controller a sixth command to a piston squirter system to squirt oil into the plurality of cylinders.

In at least one embodiment, the method further includes issuing by the controller a seventh command to a variable valve timing (VVT) system to coordinate opening and closing timing of the intake valves and the exhaust valves of the plurality of cylinders to maximize temperature of air leaving the exhaust manifold.

In at least one embodiment, the internal combustion engine (ICE) emission mitigation signal is a hybrid vehicle turn-on signal.

In at least one embodiment, the internal combustion engine (ICE) emission mitigation signal low battery state of charge signal.

In at least one embodiment, the method further includes issuing by the controller an eighth command to a catalyst heater system to turn on a catalyst heater, wherein the catalyst heater is disposed between the exhaust manifold and the catalyst brick.

An emission mitigation system for a hybrid vehicle includes at least one processor; and at least one memory communicatively coupled to the at least one processor, the at least one memory comprising instructions that upon execution by the at least one processor, causes the at least one processor to: receive an internal combustion engine (ICE) emission mitigation signal prior to initiating normal operation of an ICE of the hybrid vehicle, the ICE comprising a plurality of cylinders, wherein each of the plurality of cylinders includes: a combustion chamber; an intake valve configured to be opened to enable a first air flow from an intake manifold to the combustion chamber and closed to restrict the first air flow from the intake manifold to the combustion chamber; an exhaust valve configured to be opened to enable a second air flow from the combustion chamber to an exhaust manifold and a closed to restrict the second air flow from the combustion chamber to the exhaust manifold; a piston; and a crankshaft coupled to the piston, wherein rotation of the crankshaft causes a reciprocating motion of the piston within the cylinder; issue a first command to a throttle system of the hybrid vehicle to at least partially open a throttle to enable air flow into the intake manifold; issue a second command to an electric motor system of the hybrid vehicle to rotate the crankshaft coupled to each of the plurality of cylinders, wherein: the reciprocating motion of the piston in each cylinder compresses air in the combustion chamber of the cylinder causing the second air flow to be a compressed version of the first air flow; the first air flow has a first temperature, and the second flow air flow has a second temperature, the second temperature being higher than the first temperature; and the second air flow flows from the combustion chamber of the cylinder to the exhaust manifold via the exhaust valve of the cylinder and from the exhaust manifold through a catalyst brick.

In at least one embodiment, an exhaust back pressure valve is disposed one of between the exhaust manifold and the catalyst brick and after the catalyst brick; and the at least one memory further includes instructions that upon execution by the at least one processor, causes the at least one processor to issue a third command to an exhaust back pressure valve system to at least partially close the exhaust back pressure valve.

In at least one embodiment, the electric motor system includes at least one of an P0 electric motor, a P1 electric motor, a P2 electric motor, a P3 electric motor, and a P4 electric motor; and the at least one memory further includes instructions that upon execution by the at least one processor, causes the at least one processor to issue the second command to the electric motor system to rotate the crankshaft using at least one of the P0 electric motor, the P1 electric motor, the P2 electric motor, the P3 electric motor, and the P4 electric motor to generate electrical power to implement the rotation of the crankshaft.

In at least one embodiment, the at least one memory further includes instructions that upon execution by the at least one processor, causes the at least one processor to issue a fourth command to an oil pump system to an oil pump system to increase lubricant oil flow into the ICE.

In at least one embodiment, the at least one memory further includes instructions that upon execution by the at least one processor, causes the at least one processor to issue a fifth command a thermal coolant system to one of turn off coolant flow to the ICE and turn off coolant flow to the oil-to-water heat exchanger.

In at least one embodiment, the at least one memory further includes instructions that upon execution by the at least one processor, causes the at least one processor to issue a sixth command to a piston squirter system to squirt oil into the plurality of cylinders.

In at least one embodiment, the at least one memory further includes instructions that upon execution by the at least one processor, causes the at least one processor to issue a seventh command to a variable valve timing (VVT) system to coordinate opening and closing timing of the intake valves and the exhaust valves of the plurality of cylinders to maximize temperature of air leaving the exhaust manifold.

In at least one embodiment, the internal combustion engine (ICE) emission mitigation signal is a hybrid vehicle turn-on signal.

In at least one embodiment, the internal combustion engine (ICE) emission mitigation signal is a low battery state of charge signal.

A hybrid vehicle including an emission mitigation system includes: at least one processor; and at least one memory communicatively coupled to the at least one processor, the at least one memory comprising instructions that upon execution by the at least one processor, causes the at least one processor to: receive an internal combustion engine (ICE) emission mitigation signal prior to initiating normal operation of an ICE of the hybrid vehicle, the ICE comprising a plurality of cylinders, wherein each of the plurality of cylinders includes: a combustion chamber; an intake valve configured to be opened to enable a first air flow from an intake manifold to the combustion chamber and closed to restrict the first air flow from the intake manifold to the combustion chamber; an exhaust valve configured to be opened to enable a second air flow from the combustion chamber to an exhaust manifold and a closed to restrict the second air flow from the combustion chamber to the exhaust manifold; a piston; and a crankshaft coupled to the piston, wherein rotation of the crankshaft causes a reciprocating motion of the piston within the cylinder; issue a first command to a throttle system of the hybrid vehicle to at least partially open a throttle to enable air flow into the intake manifold; issue a second command to an electric motor system of the hybrid vehicle to rotate the crankshaft coupled to each of the plurality of cylinders, wherein: the reciprocating motion of the piston in each cylinder compresses air in the combustion chamber of the cylinder causing the second air flow to be a compressed version of the first air flow; the first air flow has a first temperature, and the second flow air flow has a second temperature, the second temperature being higher than the first temperature; and the second air flow flows from the combustion chamber of the cylinder to the exhaust manifold via the exhaust valve of the cylinder and from the exhaust manifold through a catalyst brick.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
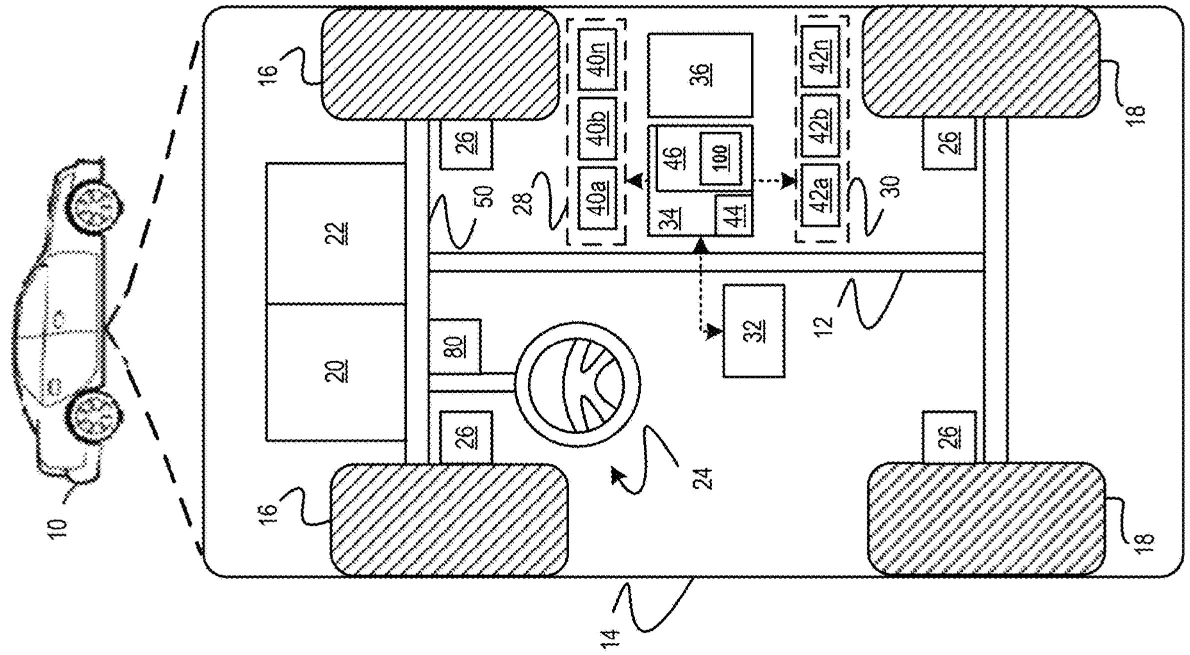
FIG. 1 is a functional block diagram of a vehicle including an emission mitigation system in accordance with at least one embodiment.

Referring to FIG. 1, a functional block diagram of a vehicle 10 including an emission mitigation system 100 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16,18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 includes an internal combustion engine and an electric machine (also referred to as an electric engine), such as a traction motor, a fuel cell propulsion system, and/or any other type of propulsion configuration. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16, 18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16, 18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42*a*-42*n* that control one or more vehicle features such as, but not limited to, one or more vehicle wheels 16-18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
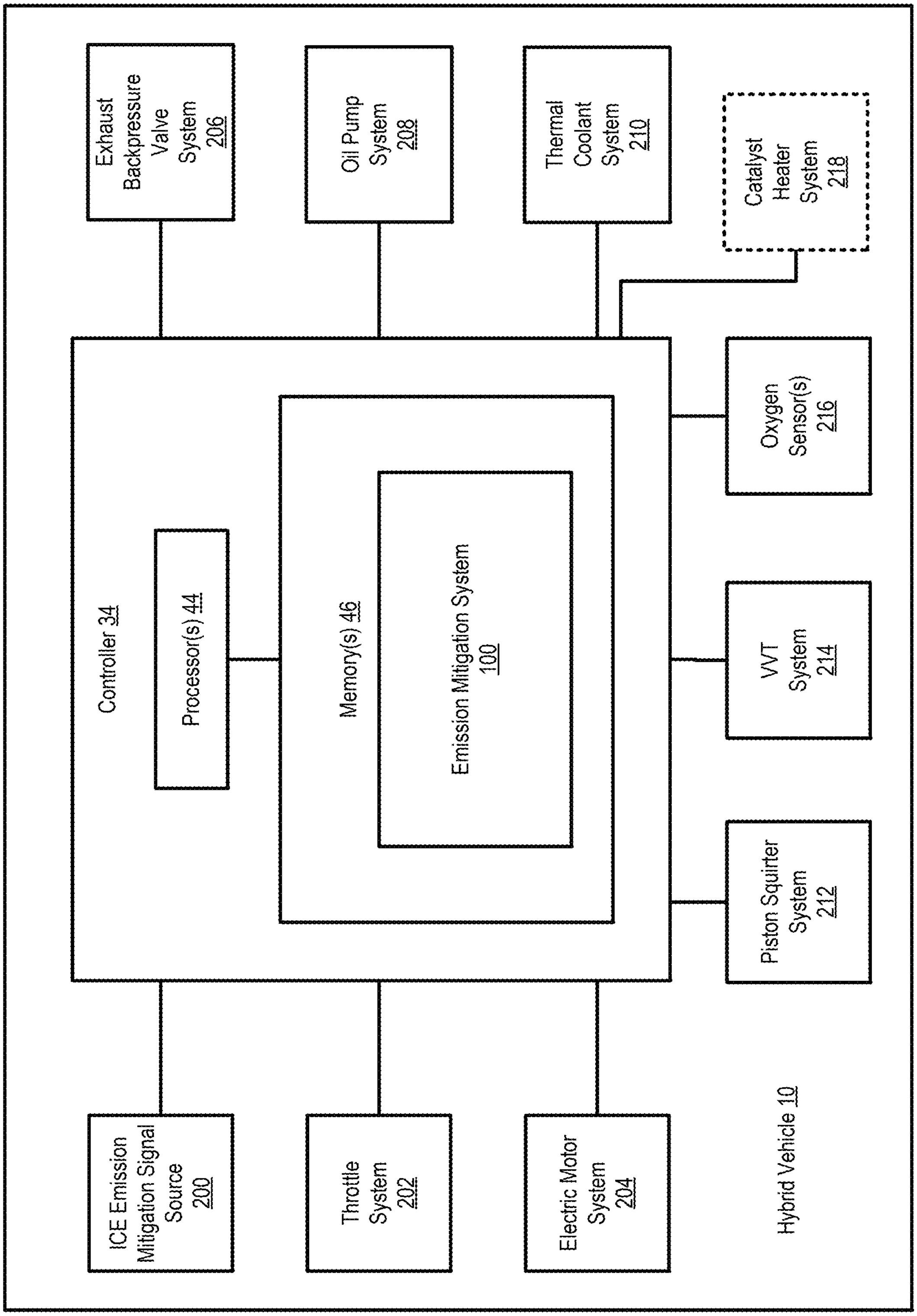
FIG. 2 is a functional block diagram of a controller including an emission mitigation system in accordance with at least one embodiment.

Referring to FIG. 2, a functional block diagram of a controller 34 including an emission mitigation system 100 in accordance with at least one embodiment is shown. The controller 34 includes at least one processor 44 and at least one memory 46. The at least one processor 44 is a programable device that includes one or more instructions stored in or associated with the at least one memory 46. The at least one memory 46 includes instructions that the at least one processor 44 is configured to execute. The at least one memory 46 includes an embodiment of the emission mitigation system 100 that is configured to mitigate emissions generated by an internal combustion engine (ICE) system of a hybrid vehicle 10 during cold start-up. The controller 34 is configured to be communicatively coupled to an ICE emission mitigation signal source 200, a throttle system 202, an electric motor system 204, an exhaust backpressure valve system 206, an oil pump system 208, a thermal coolant system 210, a piston squirter system 212, a variable valve timing (VVT) system 214, and one or more oxygen sensors 216. In at least one embodiment, the controller 34 is configured to be communicatively coupled to a catalyst heater system 218. The controller 34 may include additional components that facilitate operation of the emission mitigation system 100.

Figure 3:
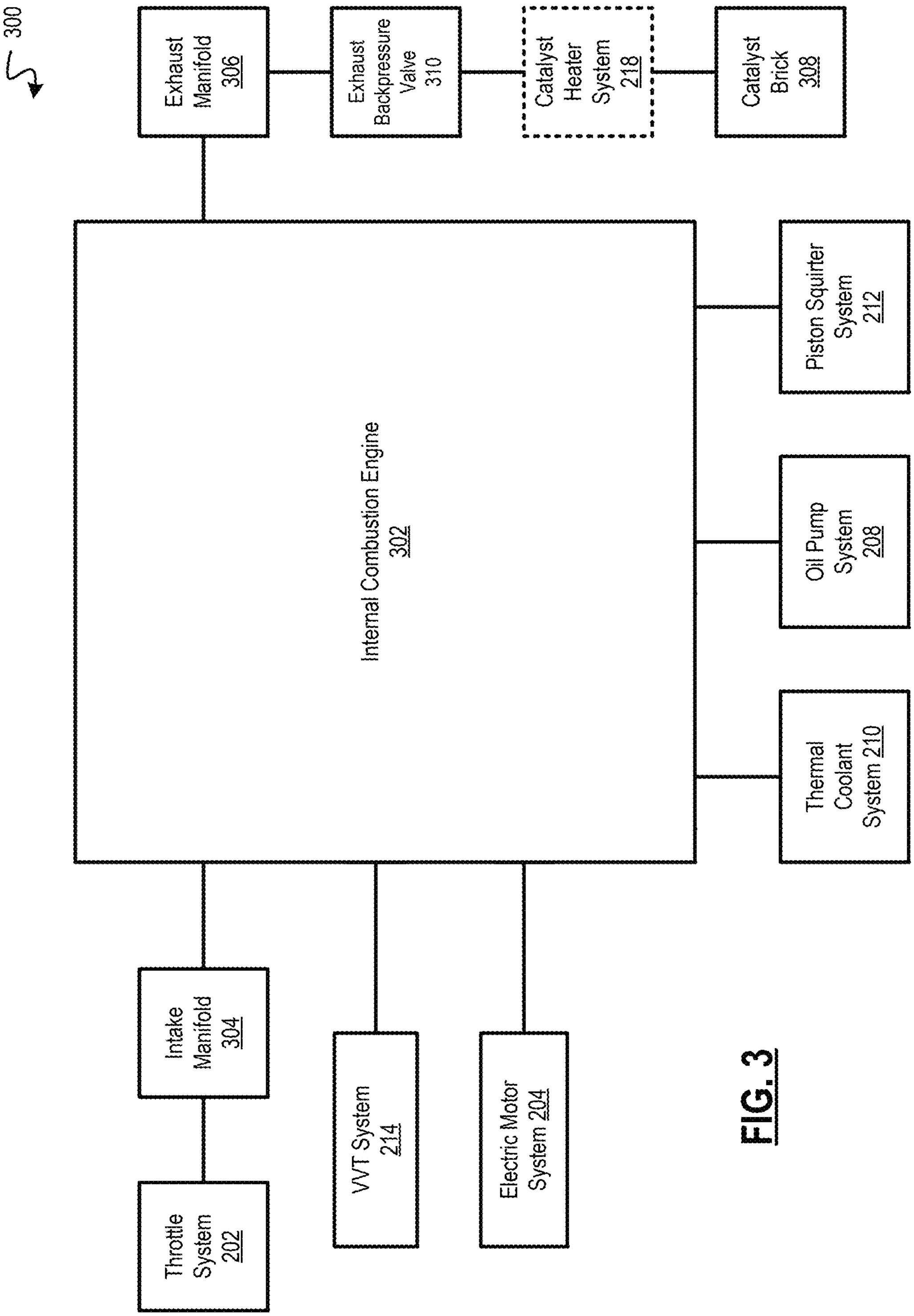
FIG. 3 is a functional block diagram of an internal combustion engine system in accordance with at least one embodiment.

Referring to FIG. 3, a functional block diagram of an internal combustion engine system (ICE) 300 in accordance with at least one embodiment is shown. The ICE 300 system includes an ICE 302. The ICE 302 includes a plurality of cylinders. Each of the plurality of cylinders is fluidly coupled to an intake manifold 304 via an intake valve. A throttle system 202 is configured to control airflow into the intake manifold 304 via a throttle.

Each of the plurality of cylinders is fluidly coupled to an exhaust manifold 306 via an exhaust valve. The exhaust manifold 306 is fluidly coupled to a catalyst brick 308 via an exhaust path. In at least one embodiment, the exhaust backpressure valve 310 is disposed in the exhaust path between the exhaust manifold 306 and the catalyst brick 308. In at least one embodiment, the exhaust backpressure valve 310 is disposed after the catalyst brick 308. The exhaust backpressure valve system 206 is configured to manage the opening and closing of the exhaust backpressure valve 310. In at least one embodiment, a catalyst heater system 218 is disposed in the exhaust path between the exhaust manifold 306 and the catalyst brick 308. In at least one embodiment, the catalyst heater system 218 is disposed in close proximity to the catalyst brick 308.

The ICE 302 is operably coupled to a variable valve timing (VVT) system 214. The VVT system 214 manages timing associated with the opening and closing of the intake valves and the exhaust valves of each of the plurality of cylinders in the ICE 302. The electric motor system 204 is configured to implement reciprocating motion of a piston within each of the plurality of cylinders via rotation of an associated crankshaft.

A thermal cooling system 210 is operably coupled to the ICE 320. The thermal cooling system 310 is configured to manage coolant flow to the ICE 302. An oil pump system 208 is operably coupled to the ICE. The oil pump system 208 is configured to pump lubricant oil into the moving components associated with the operation of the cylinders in the ICE 302. The piston squirter system 212 is configured to squirt oil to each of the plurality of cylinders in the ICE 302. The oil is thermally coupled to the engine coolant fluid by means of an oil-to-coolant heat exchanger.

The catalyst brick 308 is associated with oxygen sensor(s) 216. The catalyst light off temperature is determined based on oxygen sensor data received from the oxygen sensor(s) 216. The conversion of the exhaust gas hydrocarbon and nitrous oxides is determined via the oxygen content.

The hybrid vehicle 10 relies on the catalyst brick 310 to process the exhaust gas generated by the combustion process of the ICE 302 prior to the release of the exhaust gas as emissions from the hybrid vehicle 10. The catalyst brick 310 typically needs to reach an operating temperature, such as for example 500 C°, to effectively process the exhaust gas. The operating temperature of the catalyst brick 310 is referred to as a catalyst light-off temperature. In at least one embodiment, the catalyst light off temperature is value that is somewhere in the middle of a catalyst light-off temperature range. A cold-start of an ICE system 300 occurs when the ICE 302 has been non-operational for several hours. At cold start-up of the ICE 302, excessive emissions may be emitted until the catalyst brick 310 reaches the catalyst light-off temperature.

The emission mitigation system 100 is configured to mitigate emission generated by the hybrid vehicle 10 during cold start of the ICE 302. Prior to the initiation of the operation of the ICE 302, the emission mitigation system 100 issues a command to the electric motor system 204 of the hybrid vehicle 10 to rotate the crankshaft coupled to the cylinders. The rotation of the crankshaft causes a reciprocating motion of the piston in the cylinder. The reciprocating motion of the piston in the cylinder compresses the air in the combustion chamber of the cylinder. The compressed air exits the combustion chamber of the cylinder via the exhaust valve of the cylinder into the exhaust manifold 306. As exhaust valve timing becomes earlier than intake valve closing, more of the compression work is wasted into heat energy into the exhaust stream. While air is compressed as the piston goes up, it also expands on the way down. So, the loss comes from the difference in compression work to expansion work. The compressed air that exits the combustion chamber to the exhaust manifold 306 is hotter than the air that entered the combustion chamber from the intake manifold 304. The compressed air travels along the exhaust path to the catalyst brick 308 and flows through the catalyst brick. Heat from the compressed air is transferred to the catalyst brick 308.

Since the catalyst brick 308 is heated by the compressed air prior to initiating normal operation of the ICE 302, it will take less time for the catalyst brick 310 to reach the catalyst light-off temperature once normal operation of the ICE engine 302 is initiated. The emissions generated by the hybrid vehicle 10 following use of the emission mitigation system 100 to heat the catalyst brick 308 are lower than emissions generated without the use of the emission mitigation system 100 to heat the catalyst brick 308.

Figure 4:
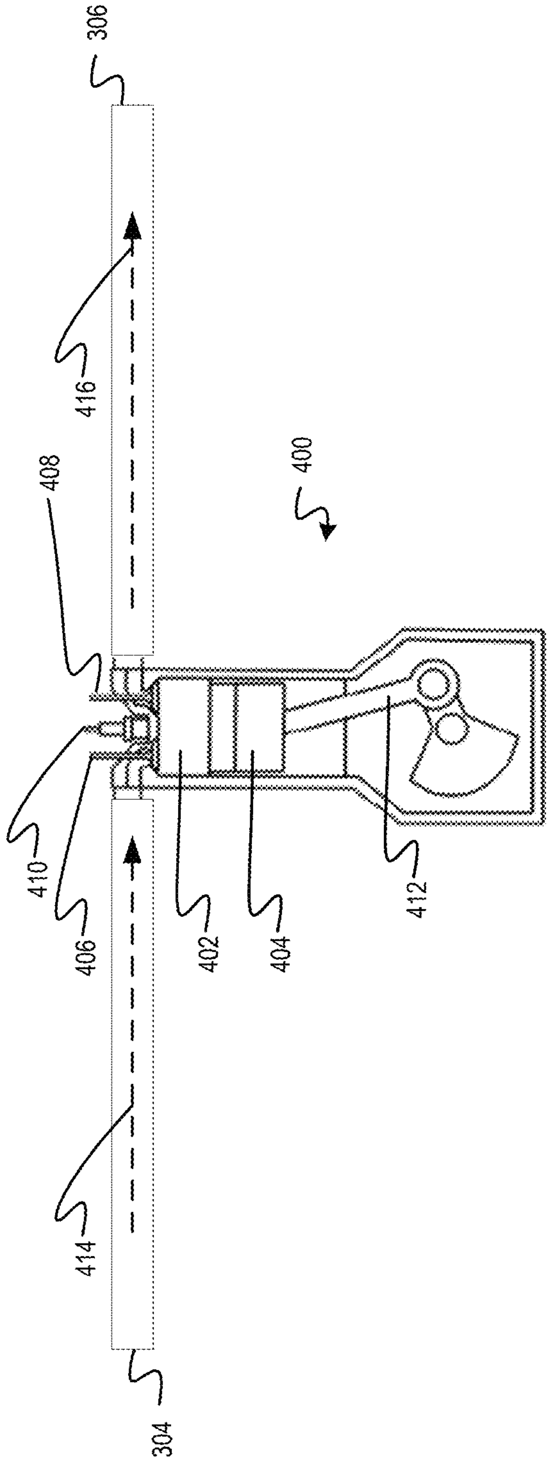
FIG. 4 is a functional block diagram of a cylinder in accordance with at least one embodiment.

Referring to FIG. 4, a functional block diagram of a cylinder 400 in accordance with at least one embodiment is shown. The ICE 302 includes a plurality of cylinders 400. Each cylinder 400 includes a combustion chamber 402, a piston 404, an intake valve 406, an exhaust valve 408, a fuel injector 410, and a crankshaft 412. The intake valve 406 can be opened and closed. As the intake valve 406 is opened, an air flow 414 is enabled from an intake manifold 304 of the hybrid vehicle 10 to the combustion chamber 402. As the intake valve 406 is closed, the air flow 414 from the intake manifold 304 to the combustion chamber 402 is restricted. The exhaust valve 408 can be opened and closed. As the exhaust valve 408 is opened, an air flow 416 is enabled from the combustion chamber 402 to an exhaust manifold 306 of the hybrid vehicle 10. As the exhaust valve 408 is closed, the air flow 416 from the combustion chamber 402 to the exhaust manifold 306 is restricted. A VVT system 214 manages the timing associated with the opening and closing of the intake valves 406 and the exhaust valves 408 of individual cylinders 400.

Prior to the initiation of normal operation of the ICE 302, the emission mitigation system 100 issues a command to the electric motor system 204 of the hybrid vehicle 10 to rotate the crankshaft 412 coupled to each cylinder 400. The rotation of the crankshaft 412 causes a reciprocating motion of the piston 404 within the cylinder 400. The reciprocating motion of the piston 404 within the cylinder 400 compresses the air in the combustion chamber 402 of the cylinder 400. The compressed air exits the combustion chamber 402 via the exhaust valve 408 into the exhaust manifold 306. The compressed air that exits the combustion chamber 402 is hotter than the air that entered the combustion chamber 402 from the intake manifold 304. The compressed air travels along the exhaust path to the catalyst brick 308 and flows through the catalyst brick 308. Heat from the compressed air is transferred to the catalyst brick 308.

Figure 5:
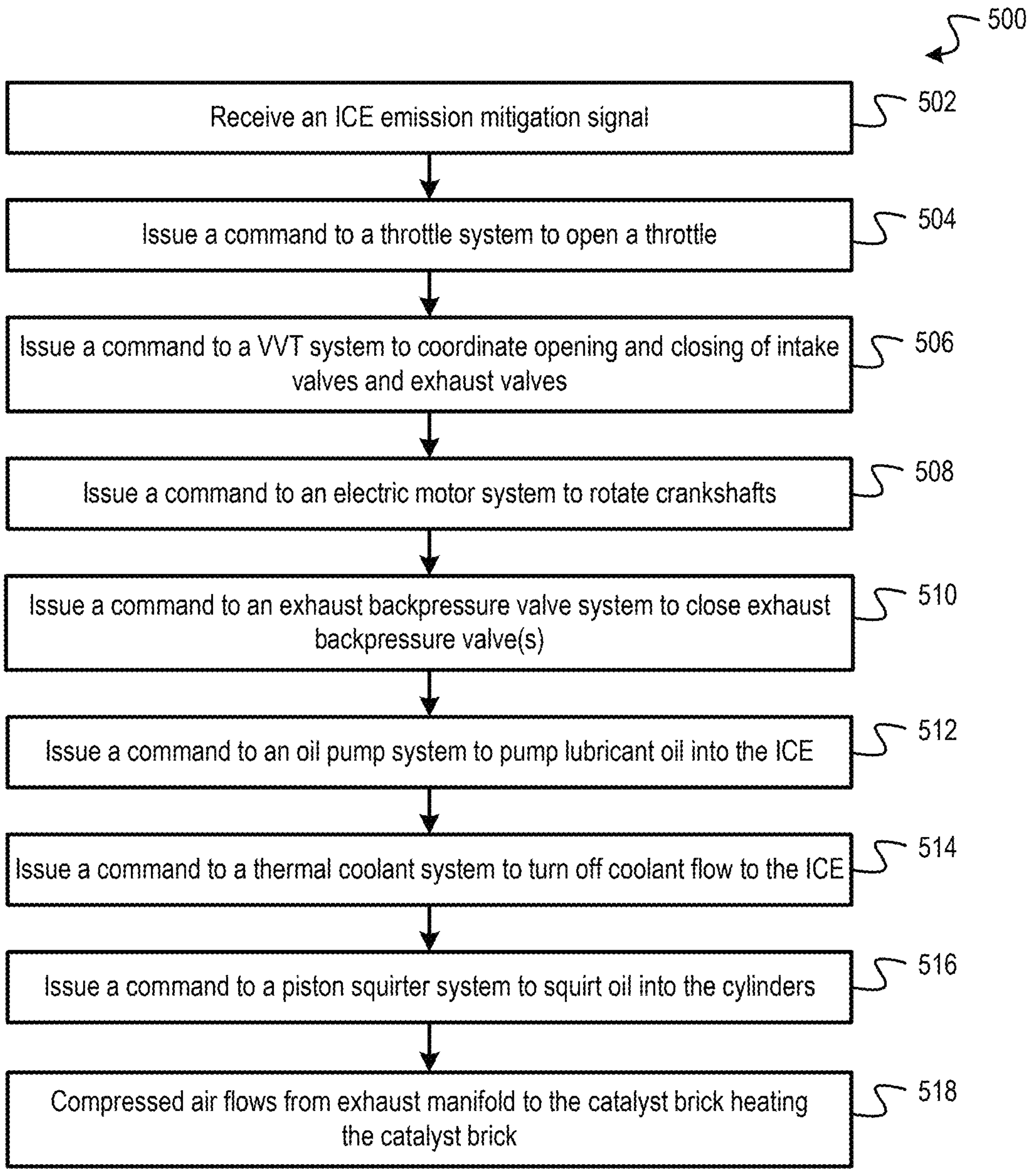
FIG. 5 is a flowchart representation of an exemplary method for mitigating emission generated by a hybrid vehicle in accordance with at least one embodiment.

Referring to FIG. 5, a flowchart representation of an exemplary method 500 for mitigating emissions generated by a hybrid vehicle 10 in accordance with at least one embodiment is shown. The method 500 will be described with reference to an exemplary implementation of an embodiment of an emission mitigation system 100. As can be appreciated in light of the disclosure, the order of operation within the method 500 is not limited to the sequential execution as illustrated in FIG. 5 but may be performed in one or more varying orders as applicable and in accordance with the present disclosure.

At 502, an ICE emission mitigation signal is received at the emission mitigation system 100 from an ICE emission mitigation signal source 200 prior to initiating normal operation of an ICE system 300 of the hybrid vehicle 10. In at least one embodiment, the ICE emission mitigation signal is a hybrid vehicle turn-on signal. In at least one embodiment, the ICE emission mitigation signal is a low battery state of charge (SOC) signal. However, not for the 12-volt engine starting battery. This applies to a prime mover battery of the hybrid system. When the hybrid vehicle 10 is using the electric engine/motor for vehicle operation, the battery (SOC) of a battery system that supplies power to the electric engine/motor declines during vehicle operation. When the battery SOC falls below a low battery SOC threshold, the battery system issues a low battery SOC signal. The low battery SOC signal indicates that the hybrid vehicle 10 will transition from electric engine/motor vehicle operation to ICE engine vehicle operation. The emission mitigation system 100 initiates the emission mitigation process upon receipt of the low battery SOC signal to heat the catalyst brick 308 in preparation for the transition from electric engine/motor vehicle operation to ICE engine vehicle operation.

At 504, the emission mitigation system 100 issues a command to a throttle system 202 to open a throttle to increase the flow of air into the intake manifold 304 of the ICE system 300 to increase the trapped air mass within the cylinder. At 506, the emission mitigation system 100 issues a command to a variable valve timing (VVT) system 214 to coordinate the opening and closing of the intake valves 406 and the exhaust valves 408 of the cylinders 400 in the ICE 302 to maximize the amount of air trapped in the combustion chamber 402 of each of the cylinders 400 during an air compression cycle, while also providing high air temperature exiting the exhaust valve(s). Cam phasing is adjusted via the VVT system 214 (earlier exhaust valve 408 opening) during engine spin for higher compression work losses to increase the heat of the compressed air. There is no fuel injected into the combustion chambers 402 of the cylinders 400 during the emission mitigation process.

At 508, the emission mitigation system 100 issues a command to the electric motor system 204 to rotate the crankshafts 412 associated with the cylinders 400 of the ICE 302. In at least one embodiment, the electric motor system 204 implements the rotation of the crankshafts 412 using at least one of a P0 motor, a P1 motor, a P2 motor, a P3 motor and a P4 motor.

The rotation of the crankshafts 412 causes a reciprocating motion of each of the pistons 404 within the associated cylinder 400. The air flows in from the intake manifold 304 into the combustion chamber 402 of the cylinder 400 via the associated intake valve 406. The air in the combustion chamber 402 is compressed by the movement of the piston 404 within the cylinder 400. The compressed air flows from the combustion chamber 402 to the exhaust manifold 306 via the associated exhaust valve 408. The air that enters the combustion chamber 402 from the intake manifold 304 has a first temperature. The compressed air that exits the combustion 402 into the exhaust manifold 306 has a second temperature. The second temperature is higher than the first temperature. The temperature of the compressed air that exits the combustion chamber 402 is higher than the temperature of the air that enters the combustion chamber 402. The temperature of the flow of air out of the combustion chamber 402 into the exhaust manifold 306 is higher than the temperature of the flow of air into the combustion chamber 402 from the intake manifold 304.

At 510, the emission mitigation system 100 issues a command to an exhaust backpressure valve system 206 to at least partially close exhaust backpressure valve(s) 310. In at least one embodiment, the exhaust backpressure valve(s) 310 is disposed in an exhaust flow path between the exhaust manifold 306 and the catalyst brick 308. In at least one embodiment, the exhaust backpressure valve(s) 310 is disposed after the catalyst brick 308. At least partially closing the exhaust backpressure valve(s) 310 generates higher engine pumping work, higher exhaust side pressure losses, and increases the density of the compressed air flowing from the exhaust manifold 306 to the catalyst brick 308 before the compressed air reaches the catalyst brick 308 and drives heat into the catalyst brick 308.

At 512, the emission mitigation system 100 issues a command to an oil pump system 208 to pump lubricant oil into the ICE 302. The oil pump system 208 is configured to pump lubricant oil into the moving components associated with the operation of the cylinders 400 of the ICE 302. As the engine crankshaft 412 is rotated, the shearing of oil by the bearings and other engine lubricated parts generate heat energy released into the oil. The movement of the piston 402 within the cylinder 400 generates heat. The generated heat is transferred to the lubricant oil. The heated lubricant oil results in the piston 404 operating at a higher temperature. The heated lubricant oil results in the piston 402 being warmed. The higher operating temperature results in heat transfer to the compressed air prior to the compressed air exiting the combustion chamber 402. This increases the temperature of the compressed air exiting the combustion chamber 402 into the exhaust manifold 306. Once normal engine operation is started, the fuel evaporation and combustion processes are enhanced since the combustion chamber temperature has already been increased by means of frictional heating and oil-to-piston heating.

At 514, the emission mitigation system 100 issues a command to a thermal coolant system 210 to turn off coolant flow to the ICE 302. Turning off the flow of coolant to the ICE 302 results in the combustion chambers 402 of the cylinders 400 retaining generated heat that is transferred to the compressed air. Turning off the flow of coolant to the oil-to-coolant heat exchanger reduces the ability of the coolant to reduce oil temperature. At 516, the emission mitigation system 100 issues a command to a piston squirter system 212 to squirt oil into the cylinders 400. The squirting of oil aids warm up of the pistons 404. In many engines, the piston squirters are opened by increasing the oil pressure. In a select few engines, the oil squirter flow is commanded by a valve.

At 518, the compressed air flows from the exhaust manifold 306 to the catalyst brick 308. The heat from the compressed air is transferred to the catalyst brick 308 as the compressed air flows through the catalyst brick 308 prior to exiting the hybrid vehicle 10 via, for example, a tail pipe.

Since the catalyst brick 308 is heated by the compressed air prior to initiating normal operation of the ICE 302, it will take less time for the catalyst brick 308 to reach the catalyst light-off temperature once normal ICE operation is initiated. The emissions generated following use of the emission mitigation system 100 to heat the catalyst brick 310 prior to initiation of normal ICE operations are lower than emissions generated at ICE cold start without the use of the emission mitigation system 100.

In at least one embodiment, a catalyst heater system 218 is disposed between the exhaust manifold 306 and the catalyst brick 308 in the exhaust flow path. The emission mitigation system 100 issues a command to the catalyst heater system 218 to turn on a catalyst heater. The catalyst heater heats the compressed air further before the compressed air reaches the catalyst brick 308. This results in a higher amount of heat being transferred from the compressed air to the catalyst brick 308 as the compressed air flows through the catalyst brick 308. The engine supplied air flow helps push the catalyst heated air into the catalyst brick 308. A catalyst heater without any additional airflow into the catalyst brick 308 would not heat the catalyst brick 308 efficiently.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of mitigating emissions generated by a hybrid vehicle comprising:

receiving at a controller, an internal combustion engine (ICE) emission mitigation signal prior to initiating normal operation of an ICE of the hybrid vehicle, the ICE comprising a plurality of cylinders, wherein each of the plurality of cylinders comprises:

a combustion chamber;

an intake valve configured to be opened to enable a first air flow from an intake manifold to the combustion chamber and closed to restrict the first air flow from the intake manifold to the combustion chamber;

an exhaust valve configured to be opened to enable a second air flow from the combustion chamber to an exhaust manifold and a closed to restrict the second air flow from the combustion chamber to the exhaust manifold;

a piston; and a crankshaft coupled to the piston, wherein rotation of the crankshaft causes a reciprocating motion of the piston within the cylinder;

issuing, by the controller, a first command to a throttle system of the hybrid vehicle to at least partially open a throttle to enable air flow into the intake manifold prior to initiating the normal operation of the ICE;

issuing, by the controller, a second command to an electric motor system of the hybrid vehicle to rotate the crankshaft coupled to each of the plurality of cylinders prior to initiating the normal operation of the ICE:

issuing, by the controller, a third command to an exhaust back pressure valve system to at least partially close an exhaust back pressure valve prior to initiating the normal operation of the ICE;

issuing, by the controller, a fourth command to an oil pump system to increase lubricant oil flow into the ICE prior to initiating the normal operation of the ICE:

issuing, by the controller, a fifth command to a thermal coolant system to turn off coolant flow to the ICE and to an oil-to-water heat exchanger prior to initiating the normal operation of the ICE: and issuing, by the controller, a sixth command to a piston squirter system to squirt oil into the plurality of cylinders prior to initiating the normal operation of the ICE, wherein:

the exhaust back pressure valve is disposed one of between the exhaust manifold and the catalyst brick and after the catalyst brick;

no fuel is injected into the combustion chambers of the plurality of cylinders;

the reciprocating motion of the piston in each cylinder compresses air in the combustion chamber of the cylinder causing the second air flow;

to be a compressed version of the first air flow;

the first air flow has a first temperature, and the second flow air flow has a second temperature, the second temperature being higher than the first temperature; and the second air flow flows from the combustion chamber of the cylinder to the exhaust manifold via the exhaust valve of the cylinder and from the exhaust manifold through a catalyst brick to heat the catalyst brick;

and further comprising issuing the by the controller, a seventh command to a variable valve timing (VVT) system to coordinate opening and closing timing of the intake valves and the exhaust valves of the plurality of cylinders to maximize temperature of air leaving the exhaust manifold prior to initiating the normal operation of the ICE, wherein the closing timing of the exhaust valves is earlier than the closing timing of the intake valves.

2. The method of claim 1, wherein:

the electric motor system comprises at least one of an P0 electric motor, a P1 electric motor, a P2 electric motor, a P3 electric motor, and a P4 electric motor; and issuing, by the controller, the second command to the electric motor system to rotate the crankshaft coupled to each of the plurality of cylinders causes one of the at least one of the P0 electric motor, the P1 electric motor, the P2 electric motor, the P3 electric motor, and the P4 electric motor to generate electrical power to implement the rotation of the crankshaft.

3. The method of claim 1, wherein the ICE emission mitigation signal is a hybrid vehicle turn-on signal.

4. The method of claim 1, wherein the ICE emission mitigation signal is a low battery state of charge signal.

5. The method of claim 1, further comprising issuing, by the controller, an eighth command to a catalyst heater system to turn on a catalyst heater prior to initiating the normal operation of the ICE, wherein the catalyst heater is disposed between the exhaust manifold and the catalyst brick.

6. An emission mitigation system for a hybrid vehicle, comprising:

at least one processor; and at least one memory communicatively coupled to the at least one processor, the at least one memory comprising instructions that upon execution by the at least one processor, causes the at least one processor to:

receive an internal combustion engine (ICE) emission mitigation signal prior to initiating normal operation of an ICE of the hybrid vehicle, the ICE comprising a plurality of cylinders, wherein each of the plurality of cylinders comprises:

a combustion chamber;

an intake valve configured to be opened to enable a first air flow from an intake manifold to the combustion chamber and closed to restrict the first air flow from the intake manifold to the combustion chamber;

an exhaust valve configured to be opened to enable a second air flow from the combustion chamber to an exhaust manifold and a closed to restrict the second air flow from the combustion chamber to the exhaust manifold;

a piston; and a crankshaft coupled to the piston, wherein rotation of the crankshaft causes a reciprocating motion of the piston within the cylinder;

issue a first command to a throttle system of the hybrid vehicle to at least partially open a throttle to enable air flow into the intake manifold prior to initiating the normal operation of the ICE;

issue a second command to an electric motor system of the hybrid vehicle to rotate the crankshaft coupled to each of the plurality of cylinders prior to initiating the normal operation of the ICE:

issue a third command to an exhaust back pressure valve system to at least partially close an exhaust back pressure valve prior to initiating the normal operation of the ICE;

issue a fourth command to an oil pump system to increase lubricant oil flow into the ICE prior to initiating the normal operation of the ICE:

issue a fifth command a thermal coolant system to turn off coolant flow to the ICE and to an oil-to-water heat exchanger prior to initiating the normal operation of the ICE: and issue a sixth command to a piston squirter system to squirt oil into the plurality of cylinders prior to initiating the normal operation of the ICE, wherein:

the exhaust back pressure valve is disposed one of between the exhaust manifold and the catalyst brick and after the catalyst brick;

no fuel is injected into the combustion chambers of the plurality of cylinders;

the reciprocating motion of the piston in each cylinder compresses air in the combustion chamber of the cylinder causing the second air flow to be a compressed version of the first air flow;

the first air flow has a first temperature, and the second flow air flow has a second temperature, the second temperature being higher than the first temperature; and the second air flow flows from the combustion chamber of the cylinder to the exhaust manifold via the exhaust valve of the cylinder and from the exhaust manifold through a catalyst brick to heat the catalyst brick;

and further comprising issuing the by the controller, a seventh command to a variable valve timing (VVT)

system to coordinate opening and closing timing of the intake valves and the exhaust valves of the plurality of cylinders to maximize temperature of air leaving the exhaust manifold prior to initiating the normal operation of the ICE, wherein the closing timing of the exhaust valves is earlier than the closing timing of the intake valves.

7. The system of claim 6, wherein:

the electric motor system comprises at least one of an P0 electric motor, a P1 electric motor, a P2 electric motor, a P3 electric motor, and a P4 electric motor; and the at least one memory further comprises instructions that upon execution by the at least one processor, causes the at least one processor to issue the second command to the electric motor system to rotate the crankshaft using at least one of the P0 electric motor, the P1 electric motor, the P2 electric motor, the P3 electric motor, and the P4 electric motor to generate electrical power to implement the rotation of the crankshaft.

8. The system of claim 6, wherein the ICE emission mitigation signal is a hybrid vehicle turn-on signal.

9. The system of claim 6, wherein the ICE emission mitigation signal is low battery state of charge signal.

10. A hybrid vehicle including an emission mitigation system comprising:

at least one processor; and at least one memory communicatively coupled to the at least one processor, the at least one memory comprising instructions that upon execution by the at least one processor, causes the at least one processor to:

receive an internal combustion engine (ICE) emission mitigation signal prior to initiating normal operation of an ICE of the hybrid vehicle, the ICE comprising a plurality of cylinders, wherein each of the plurality of cylinders comprises:

a combustion chamber;

an intake valve configured to be opened to enable a first air flow from an intake manifold to the combustion chamber and closed to restrict the first air flow from the intake manifold to the combustion chamber;

an exhaust valve configured to be opened to enable a second air flow from the combustion chamber to an exhaust manifold and a closed to restrict the second air flow from the combustion chamber to the exhaust manifold;

a piston; and a crankshaft coupled to the piston, wherein rotation of the crankshaft causes a reciprocating motion of the piston within the cylinder;

issue a first command to a throttle system of the hybrid vehicle to at least partially open a throttle to enable air flow into the intake manifold prior to initiating the normal operation of the ICE;

issue a second command to an electric motor system of the hybrid vehicle to rotate the crankshaft coupled to each of the plurality of cylinders prior to initiating the normal operation of the ICE:

issue a third command to an exhaust back pressure valve system to at least partially close an exhaust back pressure valve prior to initiating the normal operation of the ICE; issue a fourth command to an oil pump system to increase lubricant oil flow into the ICE prior to initiating the normal operation of the ICE;

issue a fifth command a thermal coolant system to turn off coolant flow to the ICE and to an oil-to-water heat exchanger prior to initiating the normal operation of the ICE; and issue a sixth command to a piston squirter system to squirt oil into the plurality of cylinders prior to initiating the normal operation of the ICE, wherein:

the exhaust back pressure valve is disposed one of between the exhaust manifold and the catalyst brick and after the catalyst brick;

no fuel is injected into the combustion chambers of the plurality of cylinders;

the reciprocating motion of the piston in each cylinder compresses air in the combustion chamber of the cylinder causing the second air flow to be a compressed version of the first air flow;

the first air flow has a first temperature, and the second flow air flow has a second temperature, the second temperature being higher than the first temperature; and the second air flow flows from the combustion chamber of the cylinder to the exhaust manifold via the exhaust valve of the cylinder and from the exhaust manifold through a catalyst brick to heat the catalyst brick;

and further comprising issuing the by the controller, a seventh command to a variable valve timing (VVT) system to coordinate opening and closing timing of the intake valves and the exhaust valves of the plurality of cylinders to maximize temperature of air leaving the exhaust manifold prior to initiating the normal operation of the ICE, wherein the closing timing of the exhaust valves is earlier than the closing timing of the intake valves.

11. The hybrid vehicle of claim 10, wherein:

the electric motor system comprises at least one of an P0 electric motor, a P1 electric motor, a P2 electric motor, a P3 electric motor, and a P4 electric motor; and the at least one memory further comprises instructions that upon execution by the at least one processor, causes the at least one processor to issue the second command to the electric motor system to rotate the crankshaft using at least one of the P0 electric motor, the P1 electric motor, the P2 electric motor, the P3 electric motor, and the P4 electric motor to generate electrical power to implement the rotation of the crankshaft.

12. The hybrid vehicle of claim 10, wherein the ICE emission mitigation signal is a hybrid vehicle turn-on signal.

13. The hybrid vehicle of claim 10, wherein the ICE emission mitigation signal is low battery state of charge signal.

14. The hybrid vehicle of claim 13, wherein the ICE emission mitigation signal is the low battery state of charge signal of a prime mover battery of a hybrid system of the hybrid vehicle.

* * * * *